March 25, 1969          D. R. MALEY          3,434,332
NONDESTRUCTIVE TESTER
Filed July 26, 1965
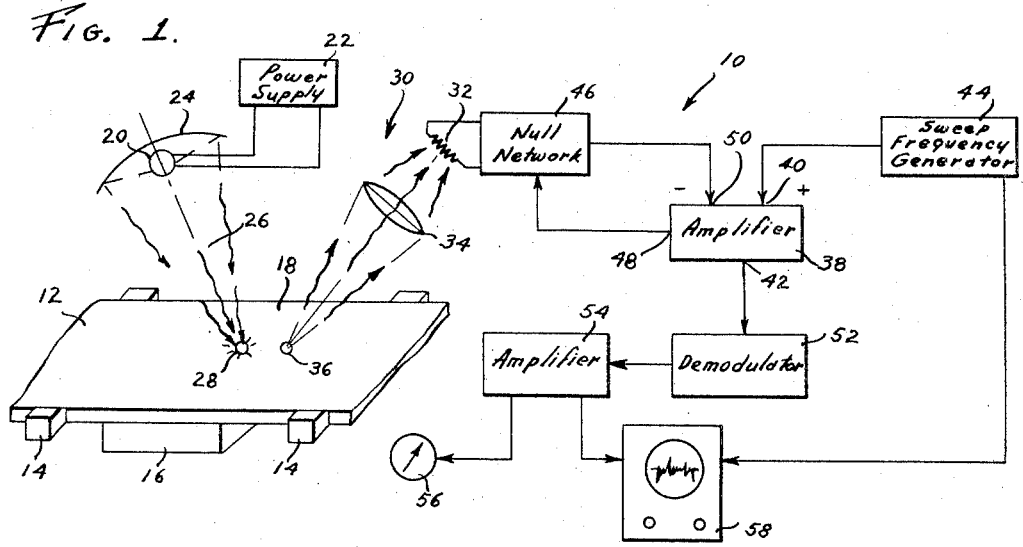
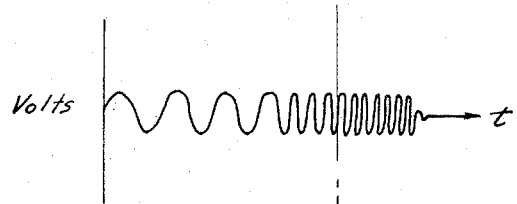
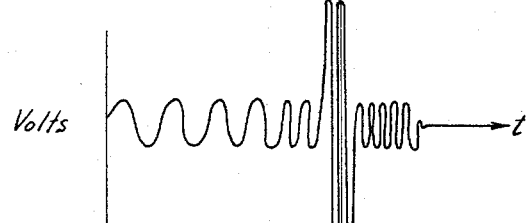
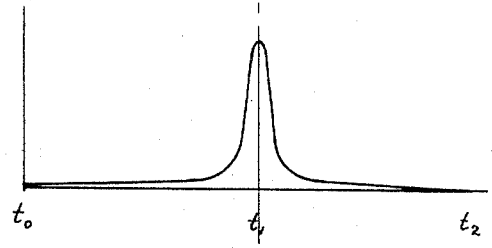
INVENTOR.
Dale R. Maley,
By
Attorney.

United States Patent Office 3,434,332
Patented Mar. 25, 1969

3,434,332
NONDESTRUCTIVE TESTER
Dale R. Maley, Boulder, Colo., assignor to Automation Industries, Inc., El Segundo, Calif., a corporation of California
Filed July 26, 1965, Ser. No. 474,709
Int. Cl. G01n 25/00
U.S. Cl. 73—15                                            7 Claims

ABSTRACT OF THE DISCLOSURE

An infrared nondestructive tester is disclosed herein which heats the workpiece and then scans the surface with a pickup to locate variations in the surface temperature. The pickup includes a temperature sensitive device, such as a thermistor which is in a feedback circuit that controls the gain of an amplifier. As the frequency of a signal sweeps over a predetermined range the gain increases at a particular frequency determined by the thermistor. This frequency indicates the surface temperature.

---

One form of nondestructive testing system capable of inspecting workpieces for hidden defects, etc., employs variations in the amount of infrared energy radiated from the surface of the workpiece. The thermal conductivity of a workpiece is not only a function of the type of material but also of the porosity and grain structure, etc. of the material, the presence or absence of any voids, inclusions, etc. within the workpiece as well as the thickness thereof, etc. Since thermal conductivity controls the rate of flow of heat through the workpiece, if there are any local variations in the various characteristics of the workpiece there will be corresponding local variations in the manner in which the heat flows through the workpiece and the manner in which the temperature of the workpiece varies. Accordingly, by measuring the temperatures of the incremental areas on the surface of the workpiece or the rates at which the temperatures change, it is possible to determine various characteristics of a workpiece. For example, it is possible to locate internal defects, i.e., a void, an inclusion, a lack of bonding between laminations, a variation in the thickness, etc.

One means that has been employed to measure the surface temperature, and particularly in small incremental areas, is to measure the infrared energy that is radiated from the area. Heretofore the radiations have been measured by means of a pickup focused on the small incremental area so as to receive at least a portion of the radiated infrared energy. The pickups employed heretofore have provided an electrical signal having an amplitude that is a function of the intensity of the radiations. By employing suitable circuitry, it is possible to utilize the signal to indicate the various characteristics of the workpiece. Although systems of this type are effective to test workpieces, since the temperature is normally fairly constant, the variations in the electrical signals are of a very low frequency. As a result, the radiation impinging upon the pickup detector is normally chopped mechanically to provide a higher frequency carrier signal for the radiation information. This allows electronic amplification and processing of the pickup signals at higher frequency, enhancing gain stability and filter design. However, a mechanical chopper disposed in front of the pickup detector poses problems in many areas. Optical design is constrained; any scanning devices the pickup might incorporate are limited by the choppers presence, energizing the chopper introduces a source of heat and vibration near the sensitive pickup detector, creating noise and bandwidth difficulties. It may thus be seen that although the foregoing infrared test systems have been capable of successfully testing workpieces, they have not been entirely satisfactory.

The present invention overcomes the foregoing disadvantages and limitations. More particularly, the present invention provides an infrared nondestructive test system which does not utilize a mechanical radiation chopper.

In the single embodiment of the present invention disclosed herein, the workpiece is heated by projecting radiant energy onto its surface whereby the temperatures of the various incremental surface areas are a function of the internal characteristics of the workpiece immediately adjacent thereto. Pickup means are positioned to successively scan the incremental areas and receive the infrared radiations that occur after the area has been heated and allowed to deliver heat to the interior of the workpiece. The pickup means forms at least a part of a frequency responsive network whereby the overall gain of the system is materially altered at some particular signal frequency that is a function of the temperature of the incremental area. A sweep frequency generator is coupled to the network so as supply a signal having a varying frequency. When the frequency of this signal is equal to the particular frequency the amplitude of the signal will vary. Output means are provided that are responsive to this frequency whereby the temperature of the workpiece may be measured.

These and other features and advantages of the present invention will become readily apparent from the following detailed description of a limited number of embodiments thereof, particularly when taken in combination with the accompanying drawings wherein like reference numerals refer to like parts and wherein:

FIGURE 1 is a block diagram of an infrared test system embodying one form of the present invention, FIGURE 2 is a graph showing one operating characteristics of one portion of the system, FIGURE 3 is a graph similar to FIGURE 2 but showing an operating characteristic of another portion of the system, and FIGURE 4 is a graph similar to FIGURES 2 and 3 but showing an operating characteristic of another portion of the system.

Referring to the drawings in more detail, and particularly to FIGURE 1, the present invention is especially adapted to be embodied in a nondestructive test system 10 for inspecting workpieces. Although any form of workpiece may be inspected, the test system 10 is shown inspecting a relatively flat member such as a sheet 12. The system 10 is capable of detecting and locating hidden defects such as voids, inclusion, lack of bonding, etc. The system is also capable of measuring dimensions such as thickness.

During a test the workpiece 12 is normally mounted on a support 14 that retains the workpiece 12 in position. The support 14 preferably includes a scan mechanism 16 for moving the workpiece 12 during a test. The scan mechanism 16 may be effective to move the workpiece 12 in one direction at a first rate of speed and in a second direction at a second rate of speed whereby the entire surface 18 may be scanned in a series of generally parallel lines.

In order to make a test, the temperature of the workpiece 12 may be varied by transferring heat into or out of the workpiece 12. Although the entire workpiece 12 may be simultaneously heated, in the present instance, heat is successively applied to limited areas as the workpiece 12 is being scanned. The heat may be produced by any suitable heater. However, in this embodiment radiant source such as the filament of an incandescent lamp or a heating element 20 is connected to a power supply 22.

A lens and/or mirror 24 is positioned next to the heater 20 whereby the radiation is focused into a well-defined beam 26 that forms a relative small "hot spot" 28 on the surface 18 of the workpiece 12.

The amount of heat in the "hot spot" 28 and the size thereof depend upon the nature of the material, the type of test being performed, the rate of scan, etc. However, the temperature rise is normally relatively small, for example, in the general range of about 25° to 50° above ambient whereby the infrared energy radiated from the surface 18 has a wavelength in the range of about 2 microns to about 15 microns.

At the "hot spot" a portion of the radiant energy in the beam 26 is converted into heat. Initially, this heat is concentrated on the surface 18 or in the region immediately adjacent thereto. However, a portion of the heat is immediately conducted into the interior of the workpiece 12 thereby it will flow transversely through the workpiece toward the back surface and laterally through the workpiece 12 generally parallel to the front and back surfaces. At the same time, some of the heat is reradiated from the surface 18 in the form of infrared energy. The amounts and wavelengths of the radiated energy are a function of the temperature of the surface 18.

The rate at which the heat is transferred into and through the interior of the workpiece 12 is a function of a large number of factors such as the thermal conductivity of the material, the amount of temperature differential, the dimensions of the material, etc. If the workpiece 12 is relatively thick, it acts as a heat sink whereby the heat will rapidly disperse throughout the entire interior of the workpiece. As a consequence, the heat will not accumulate near the surface 18 and the surface temperature will not rise appreciably. In addition, the heat will disperse rapidly and as soon as the application of heat stops the temperature will tend to return to ambient at a relatively slow rate. As a consequence, when the member is thick, the amount of infrared radiation will be relatively small and of long wavelengths.

In contrast, a relatively thin workpiece is incapable of absorbing or dispersing the heat at such a high rate. The flow of heat will rapidly reach the back surface whereby the ability of the workpiece to absorb additional heat will be determined by the rate at which the energy can flow laterally through the workpiece in directions parallel to the front and back surfaces. It can thus be appreciated that for a given amount of energy the temperature of the surface 18 for a thin workpiece 12 will rise more rapidly and to a higher level than on a thick workpiece.

The rate at which the heat is transferred throughout the workpiece 12 is a function of the thermal conductivity of the workpiece. If there are any internal localized discontinuities in the workpiece 12, such as an air pocket or void, some form of inclusion, a change in porosity or grain structure, a variation in thickness, etc., there will be a corresponding localized variation in the thermal conductivity of the workpiece 12. This, in turn, produces a corresponding localized variation in the temperature on the surface 18 corresponding to the internal variations of the workpiece 12.

It may thus be seen that the instantaneous temperature of the incremental surface area will be a function of the thermal conductivity of the member. As a result, by measuring this temperature, the characteristics of the workpiece 12 including its thickness, internal integrity, etc., may be ascertained.

To measure the temperatures of the incremental areas, any suitable pickup means 30 may be employed. In the present instance, the pickup 30 includes a transducer 32 that is responsive to infrared radiations. The transducer 32 and its characteristics will be described in more detail subsequently. However, for the moment, it will suffice to say that the transducer 32 is responsive to the infrared radiations and is effective to change at least one of its electrical characteristics in response thereto.

In order to increase the sensitivity and/or selectivity of the pickup 30, a suitable focusing means such as a mirror or a lens 34 may be employed. The lens 34 is focused onto a small area 36, preferably smaller than the "hot spot" 28. The focus spot or area 36 is preferably positioned on the same scan line as the "hot spot" 28 but displace slightly therefrom. The lens 34 will thereby be looking at an area 36 a predetermined time interval after it has been heated by the heater 20.

As a consequence, the incremental area 36 will first be heated at a predetermined rate to form a "hot spot" 28 having a predetermined amount of energy therein. The heating of the "hot spot" 28 will then terminate and the energy will tend to disperse in the manner described above, i.e., a portion of the energy will flow through the workpiece 12 and a portion will be radiated from the surface 18 as infrared energy. The rate at which the energy is conducted through the workpiece 12 and, therefore, the rate at which the temperature of the "hot spot" 28 falls will be a function of the internal characteristics of the workpiece 12.

The transducer 32 is coupled to means for sensing the temperature thereof. In the present instance this means includes an amplifier 38 having a signal input 40 and a signal output 42. The amplifier 38 which may be of a conventional variety is effective to amplify any signals on the input 40 and provide an amplified signal on the output 42. The characteristics of the amplifier 38 are not particularly critical. However, as will become apparent subsequently, it is desirable for the gain of the amplifier 38 to be reasonably uniform over the entire operating range.

The input 40 is coupled to a suitable signal source. The present source is a variable frequency or sweep frequency generator 44. Such a generator 44 is self oscillating. However, in a sense it is unstable in that it oscillates at progressively higher frequencies. The generator 44 will thereby periodically start oscillating at a low frequency with the signal frequency progressively increasing over a preselected range to a maximum frequency.

This mode of operation will provide a signal similar to that seen in FIGURE 2. More particularly, at time $t_0$ the signal will have a relatively long period or low frequency whereas at the time $t_2$ the period will be relatively short and the frequency high. It should be noted that although the frequency of the signal varies over an extended range, the amplitude will always remain substantially constant. Thus, at any intermediate time interval such as $t_1$ the amplitude will be fixed.

In the present instance, the means for coupling the transducer 32 to the amplifier 38 includes a feedback network 46. This network 46 is coupled between an output 48 and an input 50 for degeneratively or negatively feeding back the amplified variable frequency signal. The network 46 is thereby effective to control the amount of gain of the amplifier 38 by controlling the amount of feedback. The network 46 may be of any desired variety but it is normally of a resonant nature whereby the impedance of the network 46 and, therefore, the amount of feedback is a function of the frequency.

More particularly, the impedance of the network 46 may be relatively small for most of the frequencies. This will produce a large amount of feedback whereby the overall gain of the amplifier 38 is low. However, at some particular frequency, the impedance is very high. As a consequence, for signals of that frequency, the amount of negative feedback is small and the overall gain is high.

It will thus be seen that as the frequency of the signal from the generator 44 sweeps across a band of frequencies in the manner of FIGURE 2, the amplitude of the signal from the generator 44 will be relatively uniform except at some particular time such as $t_1$. At this time $t_1$ frequency of the signal will be equal to the resonant frequency of the network 46. Accordingly, the overall gain of the amplifier 38 will be very high. This will produce a signal similar to that in FIGURE 3. This signal is of the varying frequency and has a relatively small amplitude except for a short interval at time $t_1$.

The output of the amplifier 38 is coupled to the input of a demodulator 52. The demodulator 52 is effective to demodulate the varying frequency signal and provide a signal corresponding to the envelope of the varying frequency signal. The resultant demodulated signal is of a relatively low frequency corresponding to the sweep rate of the generator 44. The amplitude of the signal, as may be seen in FIGURE 4, will be relatively small except at time $t_1$. At that time the amplitude of the signal will be very large.

The transducer 32 is coupled into the network 46 whereby some electrical characteristic of the transducer 32 will control, or at least affect, the resonant frequency of the network 46. The transducer 32 may be any suitable device that is responsive to the infrared radiations. The transducer 32 is effective to change some electrical characteristic such as its impedance in response to the radiations. By way of example, the transducer 32 may be a thermistor or an infrared sensitive photoconductive cell that changes its resistance.

The transducer 32 and the network have a full frequency at which the impedance is very low. The null frequency is a function of the resistance of the transducer and thereof the radiations incident upon the transducer 32. It will thus be seen that the frequency at which the minimum feedback in amplifier 38 occurs will be a function of the radiations incident upon the transducer 32.

In order to use the present system for testing a workpiece, the workpiece 12 may first be mounted on the support 14 and the scan mechanism 16 turned on. At the same time, the power supply 22 may be energized whereby the heater 20 will project a substantial amount of infrared energy into a "hot spot" 28 or the surface 18 of the workpiece 12. A portion of this energy will be converted into heat and flow through the interior of the workpiece 12.

As the workpiece 12 moves, the "hot spot" 28 will scan across the surface 18 of the member 12. As soon as the "hot spot" has passed a given incremental area, that portion of the workpiece will begin cooling whereby the temperature will tend to return to the ambient temperature. The amount of initial temperature rise and the rate at which the cooling occurs will be a function of the thermal conductivity of the adjacent portions of the workpiece 12. This, in turn, will be a function of the presence or absence of voids, inclusions, etc.

The lens 34 in the pickup means 30 is focused on a small incremental area 36 aligned with the "hot spot" 28. The lens 34 focuses a portion of the infrared radiations onto the transducer 32 whereby a characteristics such as the resistance thereof will be a function of the temperature of the incremental area 36.

The sweep generator 44 will periodically produce a signal which at time $t_0$ will be of a relatively low frequency but will progressively increase in frequency so as to reach a maximum frequency at time $t_2$. This signal is coupled into the amplifier 38 whereby it will be amplified to a generally constant amplitude. A portion of the amplified signal is coupled from the output 48 of the amplifier 38 through the null network 46 back to the input 50 of the amplifier 38 so as to form a degenerative feedback. The null network 46 is of a resonant nature and has a null frequency at some particular signal frequency. The frequency of this null point is a function of the characteristics of the transducer 32. Thus, the null frequency will continuously change as a function of the temperature of the incremental area 36.

As the frequency of the signal passes through the null frequency, the resonant nature of the network 46 will greatly reduce the amount of feedback. As a consequence, the overall gain of the system 10 will be greatly increased. This, in turn, will result in the signal from the amplifier 38 resembling the signal in FIGURE 3. More particularly, this signal will have a substantially uniform amplitude except at time $t_1$. At this time, the signal will have a very large amplitude compared to the rest of the signal.

The signal of FIGURE 3 is, in turn, coupled to the demodulator 52 which is effective to demodulate the signal and provide a signal similar to that in FIGURE 4. This signal has a relatively low amplitude except that at time $t_1$ when it has a large amplitude pulse. Since the occurance of this pulse is coincident with the frequency of the signal and the null frequency of the network, the time at which this pulse occurs will be a function of the radiations incident upon the transducer 32.

The demodulator may be coupled to any suitable output means. By way of example, in the present instance the output means includes an amplifier 54 that is capable of increasing the amplitude of the signal to a more useful level. The amplifier 54 is, in turn, coupled to indicating means such as a meter 56 or cathode ray oscilloscope 58. The oscilloscope 58 may be coupled to the sweep frequency generator 44 whereby the scanning in the oscilloscope 58 may be synchronized with the frequency sweep from the generator 44. Thus, the display produced by the oscilloscope 58 will be a series of markers whose horizontal position will correspond to the temperature of the incremental area being scanned. An operator may observe the oscillogram, and if there are any variations in the characteristics of the workpiece, the position of the marker will change whereby the operator will immediately know that there is a discontinuity in one or more characteristics of the workpiece.

While only a single embodiment of the present invention is disclosed herein, it will be readily apparent to persons skilled in the art that numerous changes and modifications may be made thereto without departing from the scope of the invention. For example, the transducer 32 and the feedback network may be of any desired variety. Also, it should be noted that although a sweep generator is shown as sweeping a band of frequencies, means may be employed which maintain the frequency of the signal at a null frequency determined by temperature. Accordingly, the foregoing disclosure aand description thereof are for illustrative purposes only and do not in any way limit the invention which is defined only by the claims which follow.

I claim:

1. A nondestructive tester for determining a characteristic of a workpiece, said tester including the combination of heat transfer means for being coupled to the workpiece, said means being effective to produce a change of temperature in the workpiece whereby the instantaneous temperature of each incremental area of the surface of the workpiece is a function of a characteristic of the workpiece adjacent thereto, a sweep frequency generator effective to produce an electrical signal having a frequency that varies over a predetermined range, pickup means adapted to be positioned adjacent to the workpiece so as to scan the incremental areas of the workpiece, said pickup means having a variable impedance that is responsive to the temperature of the incremental area being scanned, a feedback loop coupled to the generator and including the pickup means, said feedback loop having a gain which is a function of the impedance of the pickup means for varying the amplitude of said signal as a function of the temperature, and output means coupled to the pickup means and responsive to the amplitude of the signal to indicate the characteristic of the workpiece.

2. A nondestructive tester for determining the characteristic of a workpiece, said tester including the combination of
- a sweep frequency generator effective to produce an electrical signal having a frequency that varies over a predetermined range of frequencies,
- first means responsive to the varying frequency signal and having a gain that changes at a particular frequency,
- pickup means responsive to the temperature of the surface of the workpiece and coupled to the first means and effective to vary said particular frequency as a function of the temperature,
- a demodulator coupled to the first means and effective to demodulate said signal, and
- output means coupled to the demodulated and responsive to the frequency of said generator and the amplitude of the electrical signal.

3. A nondestructive tester for determining a characteristic of a workpiece, said tester including the combination of
- variable frequency means effective to produce an electrical signal having a frequency that varies over a predetermined range,
- an amplifier coupled to said means for amplifying said signal,
- pickup means effective to sense the temperature of the workpiece, said pickup means being coupled to the amplifier and effective to vary the gain of the amplifier at a frequency that is a function of the temperature of the workpiece whereby the amplitude of the amplified signal varies at said frequency, and
- output means responsive to the frequency at which the amplitude of the signal varies to indicate the characteristic of the workpiece.

4. A nondestructive tester for determining the incremental thermal conductivity of a workpiece, said tester including the combination of
- heat transfer means for varying the temperature of a workpiece,
- variable frequency means effective to produce an electrical signal having a frequency that varies over a predetermined range,
- frequency responsive means coupled to the variable frequency means and including pickup means having an impedance that is a function of the temperature of an incremental area of said frequency responsive means having a resonent frequency which is a function of the impedance of the pickup means whereby the amplitude of said signal varies at a frequency that is a function of the temperature of the incremental area of the workpiece, and
- output means coupled to said means and the electrical signal to indicate the incremental thermal conductivity of the workpiece.

5. A nondestructive tester for determining a characteristic of a workpiece, said tester including the combination of
- means for varying the temperature of the workpiece,
- a signal source effective to produce an electrical signal, said source including means to intermittently vary said signal over a predetermined range,
- amplifying means coupled to the source for receiving the signal therefrom,
- pickup means effective to scan the surface of the workpiece and sense the temperatures of the incremental areas thereof, said pickup means being coupled to the amplifying means and effective to vary the gain thereof at a particular point in said range, said point being a function of the temperature, and
- output means coupled to the amplifying means and responsive to the signal therefrom and the particular point at which the gain varies.

6. A nondestructive tester for determining a characteristic of a workpiece, said tester including the combination of
- a heater effective to produce a change of temperature in the workpiece whereby the instantaneous temperature of each incremental area of the surface of the workpiece is a function of the characteristic of the workpiece adjacent thereto,
- a pickup means adpated to be positioned adjacent to the workpiece, said pickup means including a thermistor responsive to the infrared radiations for an incremental area of the workpiece and effective to have an electrical resistance that is a function of the incremental area,
- a scanner coupled to the workpiece to produce relative movement between the workpiece and said pickup means whereby the pickup means scans the successive incremental areas and the resistance of the thermistor varies as a function of the temperature of the incremental areas,
- sweep frequency generator means effective to produce an electrical signal having a frequency that varies over a predetermined range,
- feedback means coupled to the generator means and including the thermistor, said feedback means having a gain that varies with frequency as a function of the resistance of the thermistor whereby the amplitude of the signal varies at a frequency which is a function of the temperature, and
- output means coupled to said feed back means and responsive to the electrical signal to indicate a characteristic of the workpiece.

7. A nondestructive tester for determining a characteristic of workpieces for said tester including the combination of
- a radiator positioned adjacent the workpiece to impress radiant energy onto a particular portion of a surface on the workpiece,
- first scan means effective to produce relative movement between the radiator and the workpiece so that the radiator scans the successive portions of said surface of the workpiece at a predetermined rate,
- pickup means positioned adjacent the workpiece for receiving infrared energy radiated from an incremental area on a surface of the workpiece,
- a sweep frequency generator effective to produce a signal having a varying frequency,
- a frequency responsive network coupled to the pickup means and the signal generator, said network being effective to produce a signal having an amplitude that is a function of the frequency of the signal,
- said scan means being effective to produce relative movement between the pickup means and the workpiece whereby the incremental area scanned by the pickup means is displaced from the portion scanned by the radiation means so that there is a time differential between the times that an incremental area is scanned by the radiator and the pickup means, and
- output means coupled to the frequency responsive means and responsive to the amplitude of the signal therefrom.

References Cited

UNITED STATES PATENTS

| | | | |
|---|---|---|---|
| 3,087,886 | 4/1963 | Robinson | 204—193.2 |
| 3,206,603 | 9/1965 | Mauro | 250—83.3 |

JAMES J. GILL, *Primary Examiner.*

E. D. GILHOOLY, *Assistant Examiner.*

U.S. Cl. X.R.

73—355; 250—83.3